July 15, 1924.
L. SCHÖN ET AL
1,501,869
ELECTRICAL TRANSLATING DEVICE
Filed March 4, 1922   6 Sheets-Sheet 2
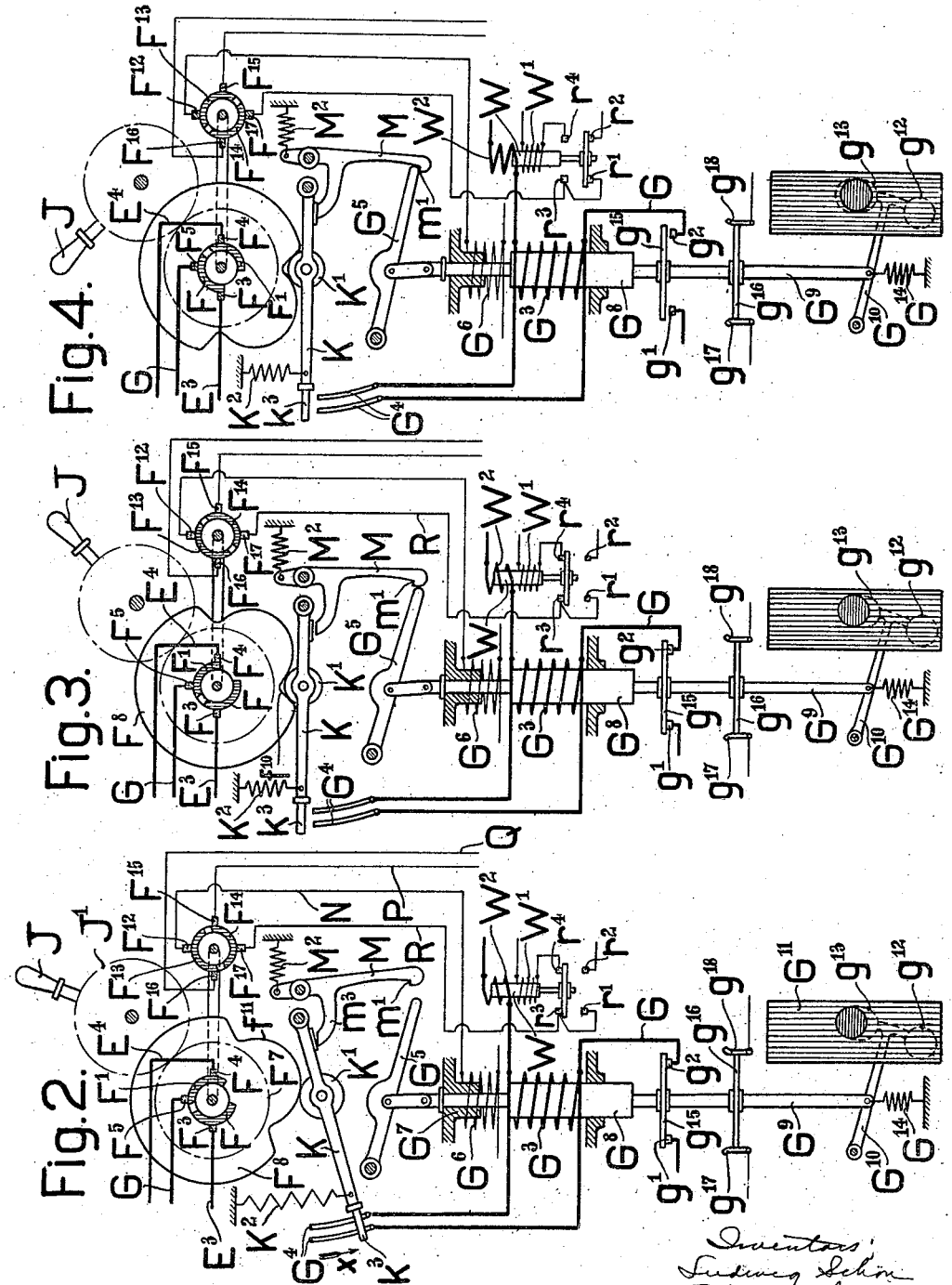

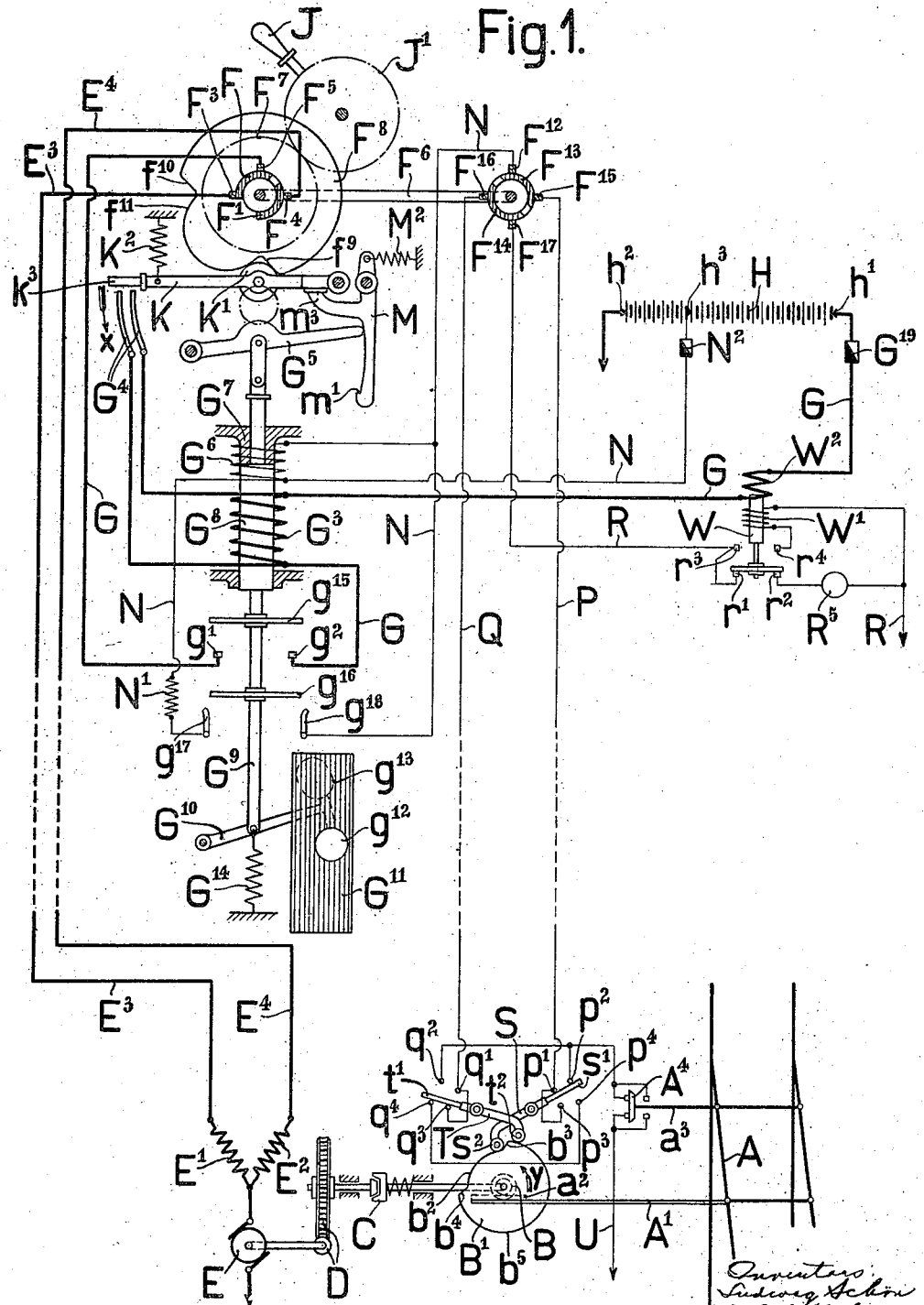

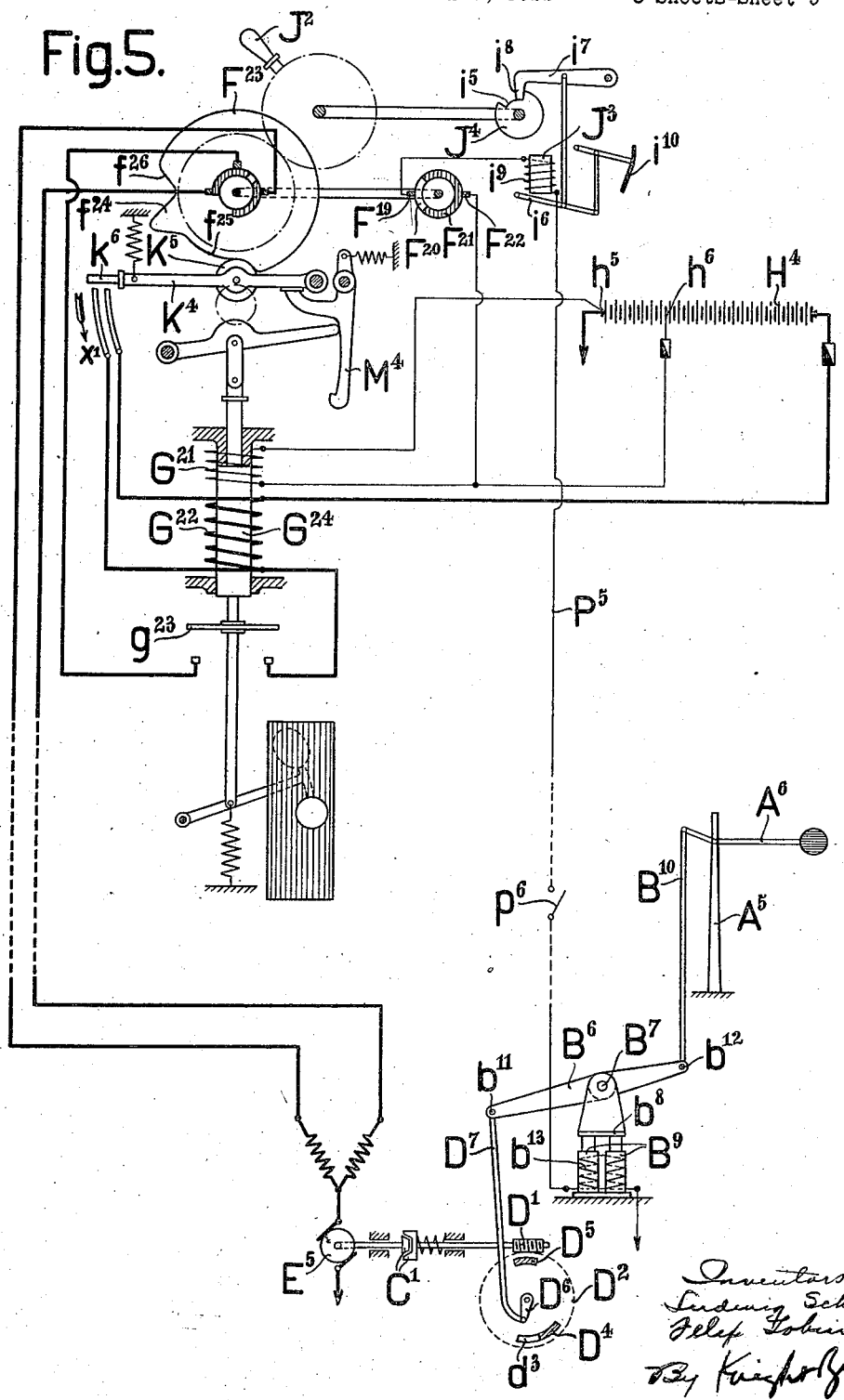

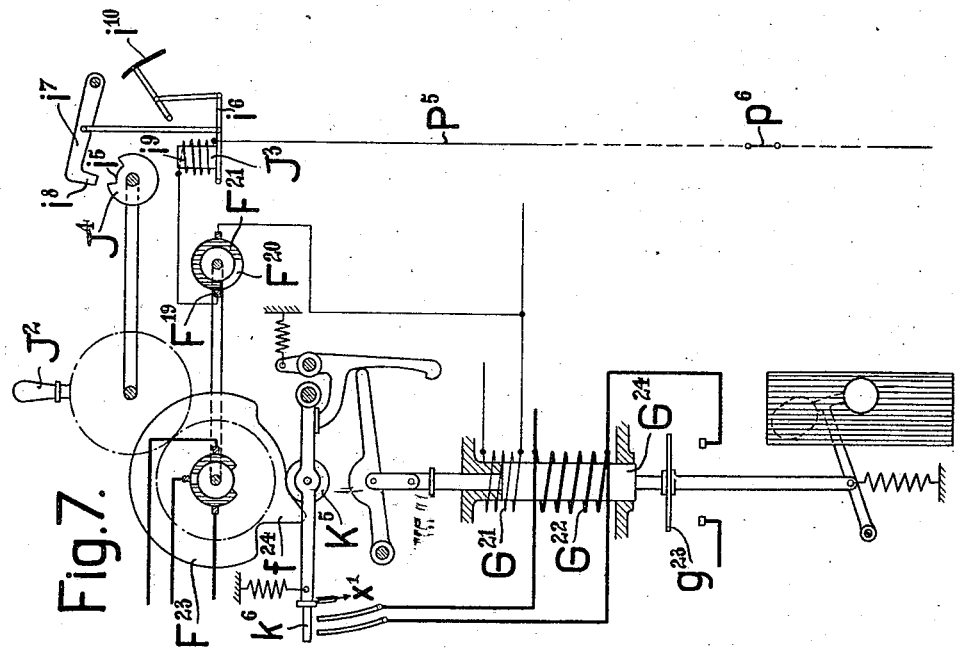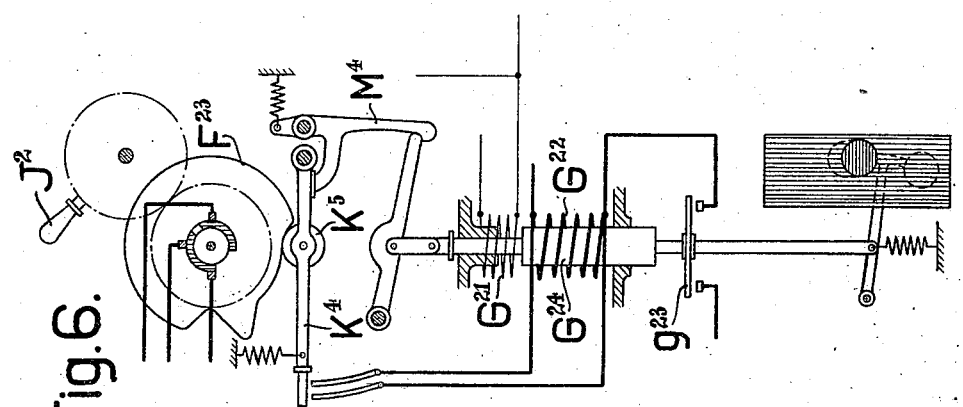

July 15, 1924. 1,501,869
L. SCHÖN ET AL
ELECTRICAL TRANSLATING DEVICE
Filed March 4, 1922 6 Sheets-Sheet 5
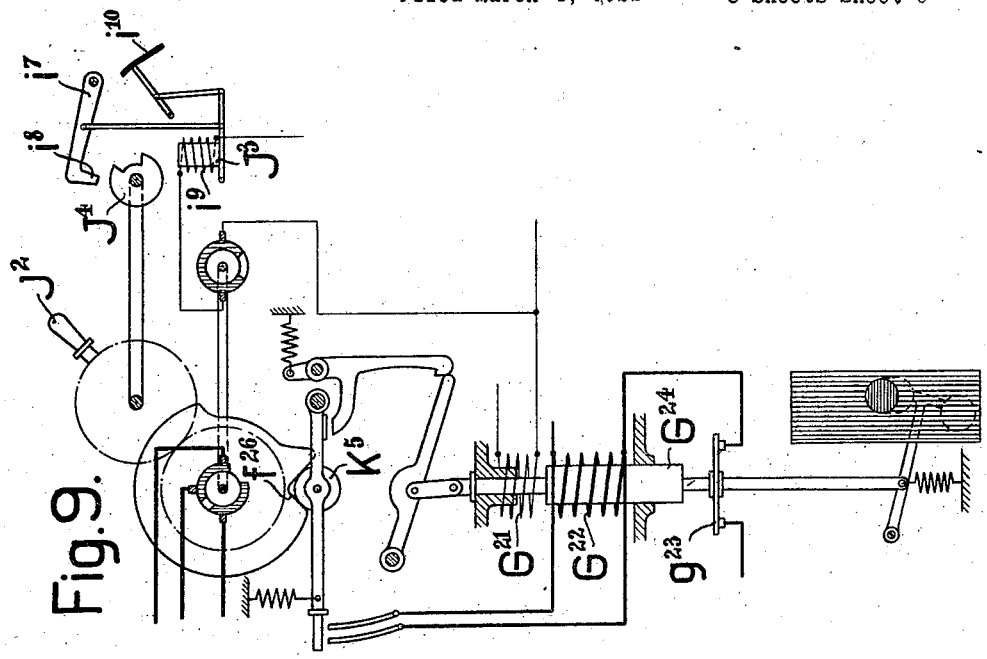
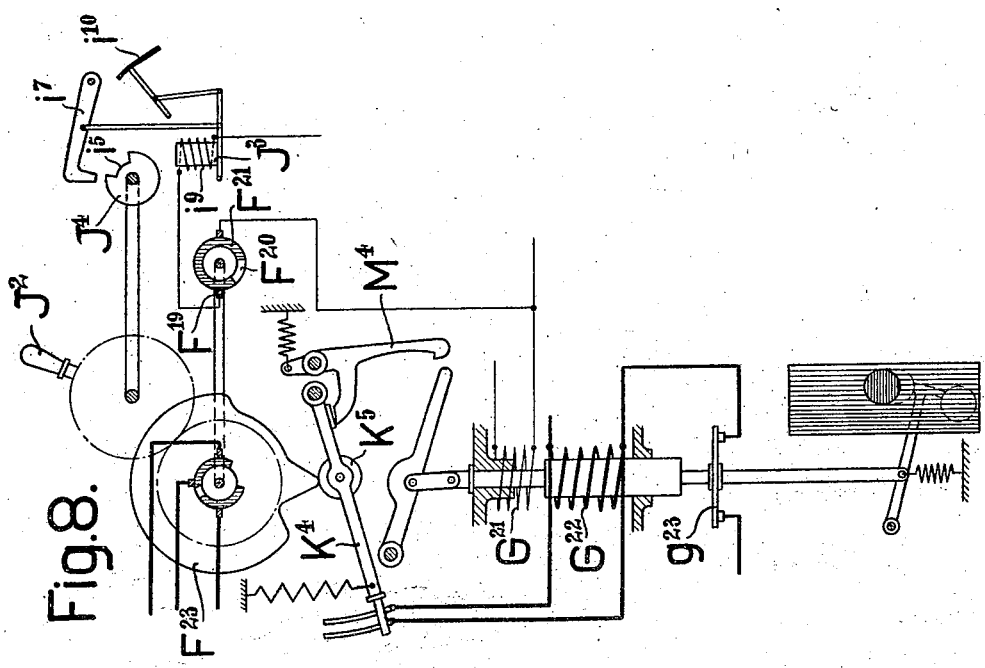

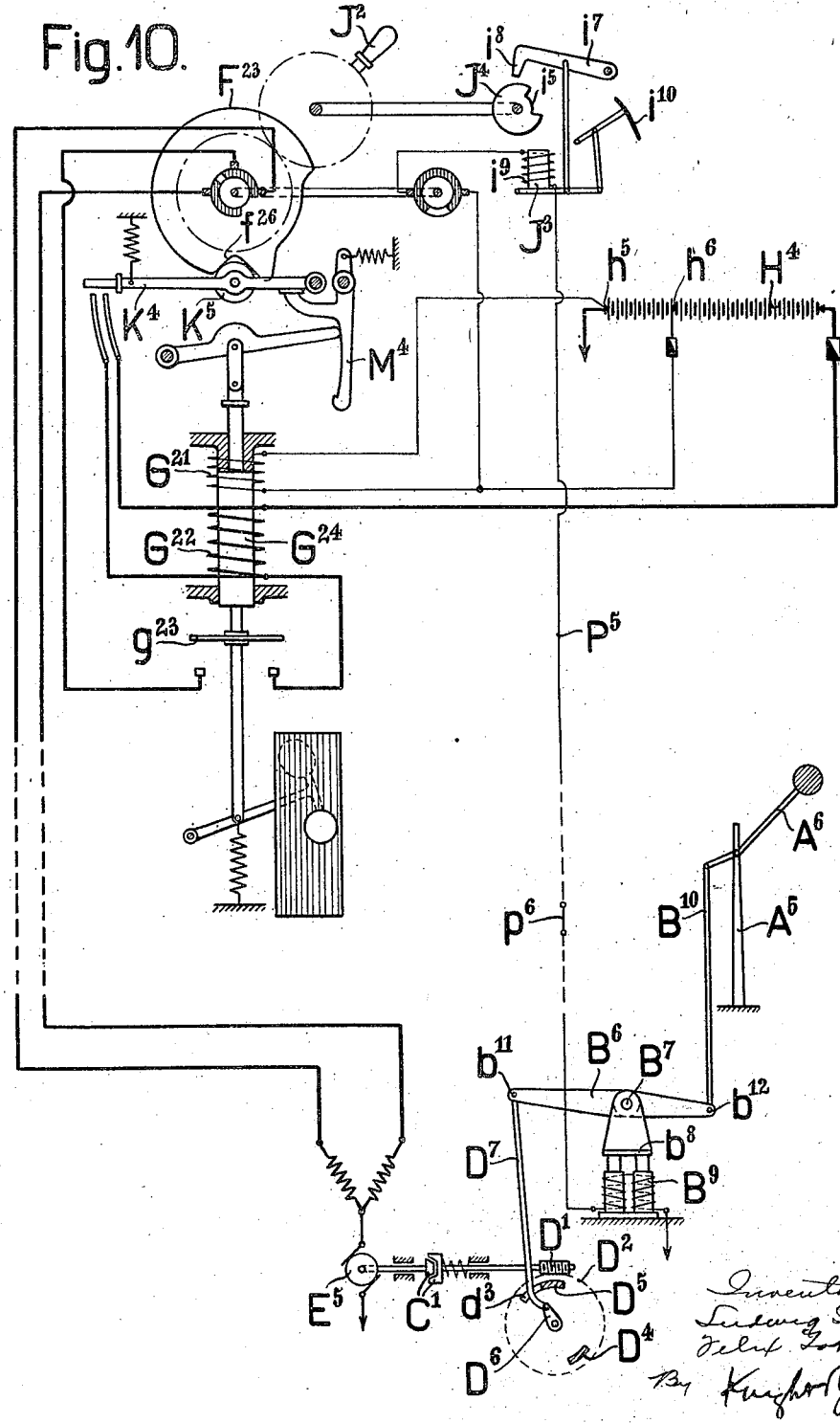

Patented July 15, 1924.

1,501,869

UNITED STATES PATENT OFFICE.

LUDWIG SCHÖN AND FELIX TOBIEN, OF ESSEN, GERMANY, ASSIGNORS TO FRIED. KRUPP AKTIENGESELLSCHAFT, OF ESSEN-ON-THE-RUHR, GERMANY.

ELECTRICAL TRANSLATING DEVICE.

Application filed March 4, 1922. Serial No. 541,071.

*To all whom it may concern:*

Be it known that we, LUDWIG SCHÖN, residing at Essen, Germany, and FELIX TOBIEN, residing at Essen, Germany, both subjects of the Republic of Germany, have invented a certain new and useful Improvement in Electrical Translating Devices, of which the following is a specification.

This invention relates to electrical translating devices, in which the parts to be translated (switches, semaphores or the like) are actuated by a motor, the direction of rotation of which is determined by the position of a reversing switch which can be operated by a controlling lever and which motor can be thrown out by means of an overload switch. The object of the invention is to provide a mechanism of this kind which has the important advantage that all possible disturbances of operation are indicated and that nevertheless, in the means actuating the parts to be set (switches, semaphores or the like), electrical contacts which have to be made or broken while current is flowing, are avoided.

The drawing illustrates diagrammatically by way of example, the invention as embodied in a switch-setting mechanism and in a signal-setting mechanism.

Fig. 1 shows the parts of the switch-setting mechanism, appertaining to a switch point, and their connection with the same.

Figs. 2 to 4 show a part of Fig. 1, with the elements in different positions.

Fig. 5 shows the parts of the signal-setting mechanism appertaining to a signal, and their connection with the signal.

Figs. 6 to 9 show a part of Fig. 5, with the elements in different positions.

Fig. 10 shows the same arrangement as Fig. 5, with some elements in a different position.

The mechanism illustrated in Figs. 1 to 4 will first be described.

The switch point A (Fig. 1) is operatively connected by a rod $A^1$, having rack-teeth $a^2$ at one end, with a pinion B, which in its turn is connected, by an elastic clutch C and worm gearing D, with the armature E of a series motor E $E^1$ $E^2$. Said motor has two oppositely wound field windings $E^1$ and $E^2$, which are conductively connected at one end with the motor armature E and at the other by wires $E^3$ and $E^4$ with a reversing switch, located in the setting mechanism housing and provided with two slide ring segments F and $F^1$. In the position of the parts shown in Fig. 1, a brush $F^3$, connected to the wire $E^3$, bears on the segment F, while a brush $F^4$, connected to the wire $E^4$, bears on the other segment $F^1$. Still another brush $F^5$ bears on the segment F and is connected, by a wire G, which contains the gap $g^1$ $g^2$ and the actuating coil $G^3$ of an overload switch, with one pole $h^1$ of a secondary battery H, the other pole $h^2$ of which, and the other terminal of the motor armature E, are connected to ground.

The reversing switch F $F^1$ is mounted on a shaft $F^6$, journalled in the setting mechanism housing (not shown), said shaft also carries a gear $F^7$, with which a gear $J^1$, provided with an actuating lever J, meshes, and a cam plate $F^8$, which is provided with two recess s $f^9$ and $f^{10}$, and a cam $f^{11}$ therebetween. In the recess $f^9$, at the right hand in the drawing, rests a roller $K^1$, (in the position of the cam plate shown in Fig. 1), which is pivotally carried by a one-armed lever K, acted upon by a spring $K^2$, and which can be moved, together with this lever K, in the direction of the arrow $x$ by the cam $f^{11}$ acting on the roller $K^1$. The lever K carries on its free end a contact piece $k^3$ adapted to bride the circuit between two sliding contact bars $G^4$, both of which are connected to the terminals of the actuating coil $G^3$ of the overload switch, so that this coil is short-circuited by the contact piece $k^3$ engaging said contact bars $G^4$. In the path of travel of the roller $K^1$ lies another one-armed lever $G^5$, which is linked to a magnet core $G^8$ longitudinally movable relatively to a pot-shaped casing $G^7$, surrounding it, which core is enveloped by the actuating coil $G^3$ and by another separately excited holding coil $G^6$.

In the path of the free end of the lever $G^5$ lies the nose $m^1$ of one arm of a two-armed pawl lever M, to the other arm of which is attached a tension spring $M^2$, which tends to turn said pawl M in clockwise direction and to hold an arm $m^3$ of the same in contact with the roller lever K. To a rod $G^9$, projecting from the core $G^8$, is pivoted a lever $G^{10}$, to the free end of which are secured two differently coloured indicating disks $g^{12}$ and $g^{13}$, enclosed in a housing $G^{11}$.

According to the adjustment of the lever $G^{10}$, one or the other of said disks is rendered visible through an opening provided in said housing $G^{11}$. When, as represented in Fig. 1, the lower (white) signal disk $g^{12}$ is visible, it signifies "safety" that is, that everything is in normal operative position, while the appearance of the upper (black) signal disk indicates "disturbance" or "danger."

To the rod $G^9$ is also attached a contact disk $g^{15}$ which is adapted to bridge over the gap $q^1$ $q^2$ in the wire G. To the free end of the rod $G^9$ is attached a spring $G^{14}$, which tends to draw down the magnet core $G^8$ and to thereby hold the overload switch in the on-position. Finally, the rod $G^9$ carries a second contact disk $g^{16}$ which is adapted to bridge a second gap having spring contact fingers $g^{17}$ and $g^{18}$. Said gap is located in a wire N, which is connected, on the one hand, through a resistance $N^1$ and a fuse $N^2$ with an intermediate terminal $h^3$ of the battery H and, on the other hand, with a brush $F^{12}$, which bears on the slide ring segment $F^{13}$ of a two-pole reversing switch secured on the shaft $F^6$ and provided with two slide-ring segments $F^{13}$ and $F^{14}$, insulated from each other. Also connected to the brush $F^{12}$ is one end of the holding coil $G^6$, above mentioned, of the overload switch, the other end of said coil being connected to that part of the wire N, which leads to the intermediate terminal $h^3$. The magnetic conditions of the overload switch are so chosen that the actuating coil $G^3$, and the holding coil $G^6$, acting in the same direction, are not capable to open the switch, when the overload switch is closed, as long as the current in the wire G does not attain a predetermined amount, materially exceeding the normal flow (excess current.) On the other hand, the separately excited holding coil $G^6$ is alone capable to hold the overload switch in the cut-out position when the magnet core $G^8$ is attracted, that is to say, when the overload switch is open.

A second brush $F^{15}$ bears on the slide-ring segment $F^{13}$, said brush being connected by a wire P through one switch, S, of two similar single-pole reversing switches S and T, located adjacent to the switch point, and through a reversing switch $A^4$, connected to the switch point A by a rod $a^3$, to a conductor U leading to earth. The reversing switch $A^4$ is adapted to bridge, in one end position of the switch point one of two gaps arranged in parallel in the conductor U, and to bridge the other of said gaps in its other end position. The one-pole reversing switch S provided with two pairs of fixed contacts $p^1$ $p^2$ and $p^3$ $p^4$, is formed as a two-armed lever, one arm of which carries a contact piece $s^1$, which engages the pair $p^1$ $p^2$ of said fixed contacts, thus conductively connecting the conductors P and U, while the other arm is provided with a roller $s^2$, bearing by its own weight on a cylindrical surface $b^2$ of a controlling cam disk $B^1$, rigidly connected with the pinion B, said roller $s^2$ at the same time touching an inclined surface $b^3$, which leads to a second cylindrical surface $b^5$ of somewhat greater diameter. The other end of the cylindrical surface $b^2$ leads to the second cylindrical surface $b^5$, through a similar inclined surface $b^4$. On the second cylindrical surface $b^5$ bears the roller $t^2$ of the second one-pole reversing switch T, the contact piece $t^1$ of which engages one pair, $q^3$ $q^4$, of two pairs of fixed contacts $q^1$ $q^2$ and $q^3$ $q^4$. The center angle, of the controlling disk $B^1$, enclosing the cylindrical surface $b^5$, is so selected that the roller $t^2$ of the reversing switch T reaches, when the disk $B^1$ is turned in the direction of the arrow $y$, the cylindrical surface $b^2$ and the inclined surface $b^4$, at the moment when the switch point A has reached the other end position than that shown. The reversing switch T is connected by a wire Q with a brush $F^{16}$, bearing on the second slide-ring segment $F^{14}$ of the two-pole reversing switch $F^{13}$ $F^{14}$. The contact pieces $p^1$, $p^2$, $p^3$, $p^4$ and $q^1$, $q^2$, $p^3$, $q^4$ of the one-pole reversing switches S and T, are so connected together, in the manner shown in Fig. 1, that a connection can be made between said switches either through the wire U, leading to earth, and one or the other of the wires P and Q, or between the said wires P and Q.

On the slide-ring segment $F^{14}$ of the two-pole reversing switch $F^{13}$ $F^{14}$, bears another brush $F^{17}$. This brush can be connected to earth by a wire R, through the two gaps $r^1$ $r^2$ and $r^3$ $r^4$ of a reversing contacter W, provided with two exciting windings $W^1$ and $W^2$, acting in the same direction. A signal lamp $R^5$ is connected to the wire R in series with the gap $r^1$ $r^2$, which is bridged in the position of rest of the contacter W, and also one, $W^1$ of said two exciting windings $W^1$ $W^2$ of the contacter W, in series with the gap $r^3$ $r^4$, which is bridged in the excited condition of said contacter W. The other winding $W^2$ of said contacter forms part of the wire G, connecting the actuating coil $G^3$ of the overload switch with the battery H, said wire G also passing through a fuse $G^{19}$, between the battery pole $h^1$ and the exciting winding. The magnetic conditions of the contacter W are so chosen that it comes to take its upper position bridging the gap $r^3$ $r^4$, when a current flows in the wire G and, consequently, in the winding $W^2$, but that the attractive force of the winding $W^1$ is only sufficient to hold the already attracted contacter in its upper position but not to move it from the lower to the upper position.

In explaining the operation of the described apparatus, it will be assumed that the parts are in the position shown in Fig. 1, in which the switch point A takes its left end position and, therefore, the reversing switch $A^4$, connected to it, bridges the corresponding gap in the wire U. In this position of the elements, the circuit is as follows:

$h^3$, $N^2$, N, $G^6$ N, $F^{12}$ $F^{13}$ $F^{15}$ P, $p^1$ $s^1$ $p^2$ $A^4$ U earth $h^2$, and the attracted core $G^8$ of the overload switch is held in the cut-out position shown, in which the white signal disk $g^{12}$ shows through the opening of the casing $G^{11}$ and indicates "safety."

When the switch is to be thrown, it is only necessary to swing the lever J in clockwise direction. This causes the cam plate $F^8$ to turn in the opposite direction, in which movement the reversing switch F $F^1$ and the switch $F^{13}$ $F^{14}$, through the shaft $F^6$, take part. The roller $K^1$ is raised out of its recess $f^9$ and rides on the cam $f^{11}$, thereby imparting a movement to the lever K in the direction of the arrow $x$. Said lever presses on the projection $m^3$ of the pawl M and causes the latter to swing until its nose $m^1$ no longer lies in the path of the lever $G^5$, pivoted to the magnet core $G^8$. As soon, therefore, as the cam plate $F^8$ has been turned so far that the roller $K^1$ presses on the lever $G^5$, the core $G^8$ falls, no longer being attracted on account of the increased air gap between it and the magnet casing $G^7$, and the contact disk $g^{15}$ bridges the gap $g^1$ $g^2$ in the main conductor G (see Fig. 2). The falling of said core $G^8$ causes the lever $G^{10}$ through the rod $G^9$, to be swung sufficiently to bring the black signal disk $g^{13}$ into sight in place of the white disk $g^{12}$, thus indicating "danger." In the swinging of the lever K, the contact piece $k^3$, carried by it, has bridged the contact bars $G^4$, so that the actuating coil $G^3$ is short-circuited through said contact piece $k^3$. A current now flows through the wire G and, since the switch F $F^1$ now takes a position in which the slide-ring segment $F^1$ conductively connects the brushes $F^4$ and $F^5$ together, from the pole $h^1$ of the battery H through $G^{19}$ G $W^2$ $G^4$ G $g^2$ $g^{15}$ $g^1$ G $F^5$ $F^1$ $F^4$ $E^4$ $E^2$ E earth, back to the pole $h^2$ of the battery H. Consequently the motor E starts to run and begins to move the switch point A, connected to it by the worm gearing D, the elastic clutch C and the rack gearing B $a^2$, towards the right; also the reversing contacter W comes into the upper position, under the influence of the series coil $W^2$, which is now excited, in which position it bridges the gap $r^3$ $r^4$. In the further movement of the lever J, the roller $K^1$ enters the recess $f^{10}$ of the cam plate $F^8$, under the influence of the spring $K^2$ engaging the lever K, and the latter moves back to its original position (see Fig. 3), whereby the bridging of the slide bars $G^4$ by the contact piece $k^3$ is again broken. Thereby the actuating coil $G^3$, which was short-circuited during the starting of the motor E, has again become effective, so that it is now ready, in case of an excess flow of current, to open the overload switch and thereby break the motor circuit. The pawl M also turns back under the influence of the spring $M^2$, as the lever K moves back, until its end carrying the nose $m^1$, rests against the free end of the lever $G^5$, pivoted to the magnet core $G^8$ (see Fig. 3).

The controlling cam disk $B^1$ turns also with the pinion B, driven by the motor E, in the direction of the arrow $y$ (see Fig. 1). In the beginning of the said turning movement, the roller $s^2$ of the reversing switch S comes onto the cylindrical surface $b^5$ of greater diameter, so that the contact piece $s^1$ now bridges the gap $p^3$ $p^4$. The circuit, therefore, as long as the movement of the disk $B^1$ continues, is closed through $h^3$ $N^2$ N $G^6$ N $F^{12}$ $F^{13}$ $F^{16}$ Q $q^1$ $q^3$ $t^1$ $q^4$ $p^4$ $s^1$ $p^3$ $p^1$ P $F^{15}$ $F^{14}$ $F^{17}$ R $r^3$ $r^4$ $W^1$ R earth $h^2$.

In the closing of the overload switch, the gap $g^{17}$ $g^{18}$ (Fig. 2) is likewise bridged by the contact disk $g^{16}$, so that now a current also flows in the branch circuit N $g^{18}$ $g^{16}$ $g^{17}$ $N^1$ N (Fig. 1) lying in parallel to the holding coil $G^6$, which is superposed on the current flowing in the wire N through said coil $G^6$. However the thereby increased strength of the current in the wire R is to be made use of in a manner to be described below. At first, the current flowing through the wire R has only the effect that, in addition to the exciting coil $W^2$ of the reversing contacter W, the exciting coil $W^1$ also tends to hold said contacter in the upper position shown in Fig. 2, so that it can maintain its position even when the main circuit is interrupted.

Now, when the movement of the disk $B^1$ is stopped by the switch point A reaching its right hand end position, the strength of the current in the main circuit immediately increases considerably, and the overload switch acts. The main conductor G, therefore, receives no longer current and the motor armature E, yieldingly connected with the pinion B by the elastic clutch C, quickly comes to rest. By the cutting-out operation of the overload switch, the magnet core $G^8$ comes again into its attracted position, the pawl M engages again the roller lever K with its projection $m^3$, under the influence of the spring $M^2$ and the appearance of the white disk $g^{12}$ in the window of the casing $G^{11}$ indicates "safety" (Fig. 1).

With the transition of the switch point A into its right hand end position, the reversing switch $A^4$ has bridged the right hand gap of the wire U. At the same time, the disk $B^1$ has taken an angular position in which the reversing switch S bears with its roller $s^2$ still on the cylindrical surface $b^5$, while the other reversing switch T bears with its roller $t^2$ upon the other cylindrical surface $b^2$. Consequently, the circuit closer piece $t^1$ now bridges the gap $q^1$ $q^2$ and a current flows in the circuit: $h^2$ $N^2$ N $G^6$ N $F^{12}$ $F^{13}$ $F^{16}$ Q $q^1$ $t^1$ $q^2$ $A^4$ U earth $h^2$.

The holding coil $G^6$ thus remains excited and holds the magnet core $G^8$ firmly in the cut-out position of the overload switch, shown in Fig. 1. On the other hand, no current flows in the branch circuit N $g^{18}$ $g^{16}$ $g^{17}$ $N^1$ N, in consequence of the separation of the contact disk $g^{16}$ from the gap $g^{17}$ $g^{18}$. Furthermore, the reversing contactor W has returned into its lower position, shown in Fig. 1 since not only has the main winding $W^2$ of the contactor W lost its current with the interruption of the current in the main conductor G, but also current no longer flows in the magnet winding $W^1$, since with the movement of the switch T into its position bridging the gap $q^1$ $q^2$, the exciting circuit, previously closed through said switch, is broken at the contact $q^3$.

All the parts now take such a position that the setting mechanism is ready for another actuation of the lever J and, therewith of the switch point A, but in the opposite direction to heretofore. When said new actuation of the lever J is performed, the operation is repeated in entirely analogous manner, until finally all the parts again take the position shown in Fig. 1.

The action of the mechanism when a so-called splitting of the switch takes place by a train passing thereover, will now be explained in connection with Figs. 1 and 4.

Starting with the parts in the position of Fig. 1, in which, particularly, the switch point A is in its left-hand end position, the gap $p^1$ $p^2$ is bridged by the switch S and the gap $q^3$ $q^4$ by the switch T. If the switch is now split, the switch S is immediately moved, under the influence of the disk $B^1$, thereby turned in the direction of the arrow $y$, into the position in which the gap $p^3$ $p^4$ is bridged. During this switching operation the circuit containing the holding coil $G^6$, has been temporarily interrupted, so that the said coil cannot hold up the core $G^8$. It therefore falls under the influence of the spring $G^{14}$; however, the gap $g^1$ $g^2$ is not bridged by the contact disk $g^{15}$, since the nose $m^1$, of the pawl M, lying in the path of the lever $G^5$, engages the lever $G^5$. Accordingly the main circuit remains opened and the motor E does not start. The falling of the core $G^8$ brings the signal disk $g^{13}$ in the place of the disk $g^{12}$ and indicates "danger;" also the contact disk $g^{16}$ bridges the gap formed by the spring contact fingers $g^{17}$ and $g^{18}$.

After the reversing switch S has taken its new position, a current flows through the circuit $h^3$ $N^2$ N, $G^6$, N $F^{12}$ $F^{13}$ $F^{15}$ P $p^1$ $p^3$ $s^1$ $p^4$ $q^4$ $t^1$ $q^3$ $q^1$ Q $F^{16}$ $F^{14}$ $F^{17}$ R $r^3$ $r^1$ $r^2$ $R^5$ R earth $h^2$, and a shunt current through the branch circuit N $g^{18}$ $g^{16}$ $g^{17}$ $N^1$ N. The last mentioned current increases the strength of the current in the wire R to such a degree that the signal lamp $R^5$ lights up. The resistance $N^1$ namely, interposed in the branch shunt circuit is so chosen that the current flowing through it is sufficient to light up the lamp $R^5$, while the exciting current of the holding coil $G^6$ is too weak to do so. By the lighting of the lamp $R^5$, which lasts as long as the split condition of the switch exists, it can be recognized with certainty that the "danger" indicated by the disk $g^{13}$ results from the splitting.

When the switch is to be returned to its initial position (left hand end position), firstly the lever J must be thrown over and then the operator must wait until the reversing operation is completed, which he recognizes by the appearance of the white disk $g^{12}$. If now the lever J is thrown back into the position shown in Figs. 1 and 4, the switch point also returns to its left hand end position, whereupon the white disk $g^{12}$, indicating "safety" appears once more, after during the reversing operation itself, the disk $g^{13}$ had indicated "danger."

The above described mechanism, however, indicates also automatically disturbances caused other than by "splitting."

If, for example, in the position of rest of the lever J, the circuit containing the holding coil $G^6$, is broken at any point, the magnet core $G^8$ falls at once and is engaged by the pawl M. The disk $g^{13}$ indicates "danger" and continues to do so until, after the circuit is completed again, the lever J and therewith the switch point A are moved over.

If, perhaps by reason of the blowing of the fuse $G^{19}$ in the main circuit, the current in the wire G is interrupted during the throwing over of the lever J, then the core $G^8$ will be depressed by the roller $K^1$ and the gap $g^1$ $g^2$ will be bridged, but the motor is not started. The disk $g^{13}$ indicates "danger." When the main current flows again, the core $G^8$ is attracted and the motor begins to start, but stops again at once owing to the interrupting of the main circuit at the gap $g^1$ $g^2$ before the position of the two switches S and T, shown in Fig. 1 has changed. But since, on the other hand, in the throwing over of the lever J, the two-pole reversing switch $F^{13}$ $F^{14}$ has been reversed, the circuit containing the holding coil $G^6$ is interrupted at the contact $p^4$ of the switch S, and the holding coil $G^6$ is no longer able to maintain the overload switch in the cut-out position. The magnet core $G^8$ falls therefore again but the lever $G^5$ is engaged by the nose $m^1$, since now the pawl M takes its position of rest. The main circuit is therefore not closed again, but the disk $q^{13}$ indicates "danger." The lever J must now be brought back into its original position, Fig. 1, in order to restore the mechanism to position ready to operate. The occurrence of this condition is indicated by the appearance of the "safety" disk $q^{12}$. If the motor has already started so far, on the return of the current in the main circuit, that the switch point A has moved somewhat out of its left hand end position, the switch S also then moving into that position in which the gap $p^3 \ p^4$ is bridged, then, after the magnet core $G^8$ has fallen, the same condition would exist as was described above for the case of "splitting," that is, the black disk $q^{13}$ indicates "danger" and the signal lamp $R^5$ lights up. But no misunderstanding can occur in this case, since the disturbance caused by the interruption and return of the main current has caused a movement of the switch point exactly as occurs when it is "split" by the passage of a train. The return to position for operation is therefore exactly the same as in the case of "splitting."

In case the motor E sticks, when the lever J is thrown over, and therefore does not start, or if one or the other of the wires $E^3 \ E^4$ is grounded, the main wire G takes current until the lever J is entirely thrown over and the roller lever K has again taken its original angular position. As soon as in so doing the short-circuit, formed by the contact piece $k^3$, of the actuating coil $G^3$ is broken again, the overload switch acts if the excess current has not previously acted to blow the fuse $G^{10}$. But the magnet core $G^8$ cannot remain in the attracted position, since the holding coil $G^6$ has become constantly currentless owing to the reversal of the two-pole switch $F^{13} \ F^{14}$ by the throwing over of the lever J. The magnet core $G^8$ therefore falls again and the black disk $q^{13}$ shows "danger." Since, however, the pawl M takes the position shown in Figs. 1 and 4, the lever $G^5$ connected to the magnet core $G^8$ engages with the nose $m^1$, so that the motor circuit remains interrupted.

It may also happen that a foreign body between the switch point and the adjacent rail prevents the complete throwing of the former. In this case the overload switch acts exactly as if the switch point A had reached its end position, that is, the current in the main circuit rises and the overload switch cuts out. But now both switches S and T lie so that the gaps $p^3 \ p^4$ and $q^3 \ q^4$ are bridged over, while on the other hand neither of the two gaps of the switch $A^4$ is bridged. There exists, therefore, no direct connection between the holding coil $G^6$ and earth, and the current flowing, in series, through said coil and the winding $W^1$ of the contacter W, which is in its upper position, is not able, in consequence of the total resistance of the circuit, to excite the holding coil $G^6$ sufficiently to hold the core $G^8$ in its attracted position. For, the conditions of resistance are so chosen that the holding coil $G^6$ can only sustain the core $G^8$ when no other resistance of any material amount lies in its circuit. The core $G^8$ therefore falls again and is held by the nose $m^1$ in the position shown in Fig. 4. The black disk $q^{13}$ shows "danger." The reversing contacter W, the winding $W^1$ of which now receives an increased current, in consequence of the parallel connection of the holding coil $G^6$ and of the resistance $N^1$, remains in its upper position.

If one of the wires P, Q, is grounded, or a short circuit exists between them with or without ground, the fuse $N^2$ will blow at once or at the next throwing of the switch A. The current then flows either through the wire P or the wire Q to earth. In consequence of the absence of current in the holding coil $G^6$, the core $G^8$ moves into the position of Fig. 4 and the disk $q^{13}$ indicates "danger" either at once, but at latest after the lever J has taken one or the other of its end positions.

From the above it will appear that the mechanism only indicates "safety," that is, readiness to operate, when the switch point A is in one or the other of its end positions and also none of the disturbances, referred to, occurs.

The second embodiment of the invention, represented in Figs. 5 to 10, differs from that described only in the omission of the reversing contacter of the switch-point-setting mechanism and of the parts in connection with said contacter, while a few other parts, adapted to the particular object of operating a signal mechanism, are added. Further, the two-pole reversing switch of the switch-point-setting mechanism, operatively connected with the setting lever, is replaced by a simple cut-out switch, and the cam disk is formed somewhat differently. In what follows only those parts will be specifically described which differentiate the second embodiment for signal setting from the first described switch-setting mechanism.

The motor armature $E^5$, Fig. 5, is connected by an elastic clutch $C^1$ with a worm $D^1$, which meshes with a worm wheel $D^2$. From the front face of said worm wheel projects a lug $d^3$, which is adapted to bear against one or the other of two fixed abutments $D^4$ and $D^5$, set at nearly 180° apart and limiting the rotation of the worm wheel $D^2$. On the shaft of said worm wheel is a crank $D^6$, which is pivotally connected by a link $D^7$ with one end, $b^{11}$, of a two-armed lever $B^6$, mounted to rock on a vertically adjustable pivot $B^7$, the base $b^8$ of which constitutes the armature of a powerful electromagnet $B^9$. To the other end $b^{12}$ of the lever $B^6$ is pivoted a rod $B^{10}$, the other end of which is pivoted to the free end of the semaphore $A^6$, formed as an angle lever and pivoted on a mast $A^5$. The magnet $B^9$ with its armature $b^8$ constitutes a signal semaphore clutch of the simplest form, which transmits movement from the motor armature $E^5$ to the semaphore $A^6$ only, when the magnet $B^9$ is excited and attracts its armature $b^8$. This position is illustrated in Fig. 5, the semaphore $A^6$ being in the stop position. The static forces are so proportioned that the turning moment, exerted by the semaphore is greater than the total resistance of the rod and lever system $D^7$ $B^6$ $B^{10}$.

The magnet $B^9$ of the semaphore coupling is provided with a winding $b^{13}$, one end of which is grounded and the other end connected through a wire $P^5$, containing a cut-out $p^6$, and through the winding $i^9$ of a latch magnet $J^3$, located adjacent to the setting lever $J^2$, to a slide brush $F^{19}$, which bears on the non-conductive part $F^{20}$ of a cut-out $F^{20}$ $F^{21}$, composed of a conductive and a non-conductive slide segment and operatively connected with the lever $J^2$. A second brush $F^{22}$, bearing on the conductive segment $F^{21}$ is conductively connected with one end of the holding coil $G^{21}$ of the overload switch $q^{23}$. The overload switch, the actuating coil $G^{22}$ of which is adapted to be short-circuited by a contact $k^6$, carried by a roller lever $K^4$, corresponds in all particulars with the overload switch of the first described apparatus, only the branch, connected in parallel with the holding coil in the latter, is omitted and therefore also the second gap.

The cut-out $p^6$ in the wire $P^5$ is so operatively connected with the main circuit cut-out switch (not shown) or with the overload switch of a switch-throwing mechanism, co-operating with the signal-setting mechanism, that it is only closed when the switch-throwing mechanism is in its normal position of rest.

The lever $K^4$, carrying a roller $K^5$, is actuated by the setting lever $J^2$ by means of a cam plate $F^{23}$, provided with a cam projection $f^{24}$ and two recesses $f^{25}$ and $f^{26}$. One of these recesses, $f^{25}$, is so extended that the roller lever $K^4$ remains unaffected during about one half of the path of travel of the setting lever $J^2$, while the other recess, $f^{26}$, is considerably shorter in the peripheral direction.

The above mentioned latch magnet $J^3$ forms a part of a latch mechanism controlling the movements of the setting lever $J^2$. Said mechanism comprises a latch disk $J^4$, keyed on the shaft of the lever $J^2$ and having in a portion of its periphery a ring sector-shaped recess $i^5$, including about 45° and serving to receive the nose $i^8$ of a pawl lever $i^7$, linked to the armature $i^6$ of the latch magnet $J^3$. The length of the recess $i^5$ is made such that the lever $J^2$ can be moved out of its position, corresponding to the stop position of the semaphore $A^6$, even when the pawl $i^7$ is in said recess, Fig. 5, said recess $i^5$ corresponding in length to that of the recess $f^{25}$ of the cam disc $f^{23}$. The recesses $i^5$ and $f^{25}$ are of this length in order to provide, before the lever $J^2$ is moved into an operative position with certainty enough time for the completion of certain automatic locking operations at the setting levers of the appurtenant switch-point mechanism. Finally, a visible indicator $i^{10}$ is operatively connected with the armature $i^6$, the position of which notifies the operator of the position of the pawl lever $i^7$ and thereby of the condition of the latch mechanism.

Starting with the parts in the position of Fig. 5, in which the semaphore $A^6$ is in the stop position, the projection $d^3$ is against the abutment $D^4$, the cut-out $p^6$ is opened and the pawl lever $i^7$ engages with its nose $i^8$ in the recess $i^5$ of the latch disk $J^4$, while the overload switch $q^{23}$ is in its cut-out position and is held therein by the holding coil $G^{21}$, connected to the poles $h^5$ and $h^6$ of the battery $H^4$.

As soon as the normal position of rest is brought about in the appurtenant switch point setting mechanisms, the switch $p^6$ closes and the operation of the signal mechanism can take place. It consists simply in this that the lever $J^2$ is turned in clockwise direction. At the latest after the lever $J^2$ has moved through the first half of its travel, the automatic locking of the setting levers of the switch-point mechanisms has taken place. During this part of the movement of the lever $J^2$ all the remaining parts of the setting mechanism remain at rest, with the exception of the latch disk $J^4$, the cam plate $F^{23}$ and the cut-out switch $F^{20}$ $F^{21}$. At the end of said phase of movement, the conductive segment $F^{21}$ of this switch comes into contact with the brush $F^{19}$ (Fig. 7). A current now flows from the battery $H^4$, Fig. 5, through $h^6$ $F^{22}$ $F^{21}$ $F^{19}$ $i^9$ $p^5$ $p^6$ $b^{13}$ earth $h^5$, which excites both the magnet $J^3$ of the latch mechanism and the magnet $B^9$ of the semaphore clutch. This results, on the one hand, in the armature $i^6$ of the latch mechanism being attracted, the pawl lever $i^7$ being disengaged from the latch disk $J^4$ and the indicator $i^{10}$ taking its upper position, and that, on the other hand, the armature $b^8$ of the semaphore clutch is held in the position of Fig. 5 by the magnet B⁹. The further movement of the lever J² meets with no further resistance. In such further movement, the cam f²⁴ strikes against the roller K⁵, so that the lever K⁴ is moved in the direction of the arrow $x^1$, Fig. 5, and the contact $k^6$ short-circuits the actuating coil G²² of the overload switch. A moment later the roller K⁵ presses against the lever, linked to the magnet core of the overload switch, so that the movable part of the overload switch $g^{23}$ falls and closes the main circuit. This condition is illustrated in Fig. 8. The indicator of the overload switch has therewith moved into the "danger" position. After the main circuit is closed, the motor armature E⁵ starts to run and to move the semaphore A⁶. The excess current, flowing for a short time after the motor armature E⁵ starts, cannot cause the overload switch to act, since the actuating coil G²² is short-circuited during the starting of the motor. When the setting lever J² comes into its other end position, Fig. 9, the roller K⁵ slides into the recess $f^{26}$, under the influence of the spring engaging the lever K⁴, and the short-circuit of the actuating coil G²² is broken. The armature E⁵ turns further and moves the semaphore A⁶ into the "clear" position (Fig. 10) through the worm drive D¹ D² and the link connections D⁷ B⁶ B¹⁰, the lever B⁶ of which turns about the axis passing through the point B⁷. The lug $d^3$ on the worm wheel D² then bears against the fixed abutment D⁵, whereby the movement of the semaphore A⁶ is limited. Thereby the current in the main circuit rises so high that the overload switch $g^{23}$ acts at once and breaks said main circuit, the indicator showing "safety". The motor armature E⁵, connected to the worm D¹ through the elastic clutch C¹, continues to run by momentum for a short time and then stops together with said clutch.

The semaphore remains in the "clear" position of Fig. 10 until it is returned to the "stop" position by a proper movement opposite to that described, of the lever J², it being assumed that the current in the wire P⁵ is not interrupted by opening the switch $p^6$. However, if the current in the wire P⁵ is interrupted, the exciting current in the magnet winding of the semaphore clutch ceases to flow, so that the semaphore falls into its "stop" position under the influence of its own weight. This causes the armature $b^8$ to lift off from the magnet B⁹ of the semaphore clutch, the lever B⁶ turning about the axis passing through the point $b^{11}$. To return the armature $b^8$ against the magnet B⁹, the lever J² must be thrown back into the original position, Fig. 5. This results, in a manner corresponding to the manner above described, in turning the motor armature E⁵ in the opposite direction, which movement is terminated as soon as the lug $d^3$ of the worm wheel D² comes up against the fixed abutment D⁴. Then excess current namely flows again and the overload switch acts to break the circuit, the indicator showing "safety." This indicates that the semaphore A⁶ is in the "stop" position and that the normal condition of the setting mechanism is restored.

In case the current in the wire P⁵ is interrupted during the movement of the semaphore A⁶ into the "clear" position, the result is the same as with an interruption in said position itself. The normal conditions must then be restored in such case by throwing over the setting lever.

Should the working be interfered with on account of the potential feeding the holding coil G²¹ failing, the magnet core G²⁴ of the overload switch falls, but is caught by the appurtenant pawl M⁴ (Fig. 6). This prevents the main circuit from being closed and the motor armature E⁵ started. The indicator shows "danger."

It will be seen that the indicator only indicates the normal condition of the setting mechanism when the semaphore is in the "clear" or the "stop" position, the exciting circuit of the semaphore clutch is not broken and said clutch is closed, and when at the same time the setting lever takes the position corresponding to the actual position of the semaphore.

Claims:—

1. In combination with an electrical translating device comprising a reversible motor, a setting member for said translating device, a reversing switch in positive connection with said setting member, an overload switch connected in series with the armature of said reversible motor comprising an overload coil, and means operated by said setting member for first short circuiting said coil prior to connecting said overload switch to said reversing switch and said motor and then removing said short-circuit from said coil after said overload switch has been connected to said reversing switch and said motor.

2. In combination with an electrical translating device comprising a reversible motor, a setting member for said translating device, a reversing switch in positive connection with said setting member, an overload switch connected in series with the armature of said reversible motor comprising an overload coil, and cam means operated by said setting member for first short circuiting said coil prior to connecting said overload switch to said reversing switch and said motor and then removing said short circuit from said coil after said overload switch has been connected to said reversing switch and said motor.

3. In combination with an electrical translating device comprising a reversible motor, a setting member for said translating device, a reversing switch in positive connection with said setting member, an overload switch for said motor having a holding coil with an exciting source, and means for cutting in said overload switch on the operation of said setting member, said means including means for positioning said overload switch away from the influence of said holding coil.

4. In combination with an electrical translating device comprising a reversible motor, a setting member for said translating device, a reversing switch in positive connection with said setting member, an overload switch for said motor having a holding coil and a main control coil, means operated by the action of said setting member for positioning said overload switch away from the influence of said holding coil, and further means operated by the continued operation of said setting member for first short-circuiting said main coil control and then removing the short-circuit from said main control coil.

5. In combination with an electrical translating device comprising a reversible motor, a setting member for said translating device, a reversing switch in positive connection with said setting member, an overload switch for said motor having a holding coil and a main control coil, means operated by the action of said setting member for positioning said overload switch away from the influence of said holding coil, and further means operated by the continued operation of said setting member for first short-circuiting said main coil control and then removing the short-circuit from said main control coil, said overload switch comprising a movable magnet core and a switch contacting device mounted on said core, said means including a device for forcibly moving said core away from the influence of said holding coil.

6. In a railroad switch system the combination with a motor, a switch point operated by said motor, a setting switch for said motor, an overload switch comprising a movable magnet core, a holding winding and a main winding, an electrical source for said windings, and means for firstly short circuiting said main winding by the operation of said setting switch, then cutting in said overload switch and thereafter removing said short-circuit after said overload switch is cut in.

7. In a railroad switch system the combination with a motor, a switch point operated by said motor, a setting switch for said motor, an overload switch comprising a movable magnet core, a holding winding and a main winding, an electrical source for said windings, and means for firstly short circuiting said main winding by the operation of said setting switch, then cutting in said overload switch and thereafter removing said short-circuit after said overload switch is cut in, said overload switch further comprising a semaphore system operated by the movement of said magnet core.

8. In a railroad switch system the combination with a motor, a switch point operated by said motor, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, said overload switch further comprising a switch contacting device mounted on said core, the operation of said setting switch being to forcibly move the switch contacts of said overload switch to closing position, and a latch setting means for holding said magnet core when brought to open circuit position after an overload has operated.

9. In a railroad switch system the combination with a motor, a switch point operated by said motor, a setting switch for said motor, an overload switch comprising a holding coil tending to keep said overload switch open and a main control coil, means operated by said setting switch for first closing said overload switch forcibly and short circuiting said main coil and then removing said short circuit on the continued movement of the setting switch after said overload switch has been cut in, and a latch means operated contactingly by said means for holding said overload switch open on the failure of said holding coil after an overload has operated.

10. In a railroad switch system the combination with a motor, a switch point operated by said motor, a setting switch for said motor, an overload switch comprising a holding coil tending to keep said overload switch open and a main control coil, means operated by said setting switch for first closing said overload switch forcibly and short circuiting said main coil and then removing said short circuit on the continued movement of the setting switch after said overload switch has been cut in, a latch means operated contactingly by said means for holding said overload switch open on the failure of said holding coil after an overload has operated, and a switching means for open circuiting said holding coil by any abnormal end position of said point switch.

11. In a railroad switch system the combination with a motor, a switch point operated by said motor, a setting switch for said motor, an overload switch comprising a holding coil tending to keep said overload switch open and a main control coil, means operated by said setting switch for first closing said overload switch forcibly and short circuiting said main coil and then removing said short circuit on the continued movement of the setting switch after said overload switch has been cut in, a latch means operated contactingly by said means for holding said overload switch open on the failure of said holding coil after an overload has operated, and a semaphore means operated by the position of said overload switch.

12. In a railroad switch system the combination with a motor, a switch point operated by said motor, a setting switch for said motor, an overload switch comprising a holding coil tending to keep said overload switch open and a main control coil, means operated by said setting switch for first closing said overload switch forcibly and short circuiting said main coil and then removing said short circuit on the continued movement of the setting switch after said overload switch has been cut in, a latch means operated contactingly by said means for holding said overload switch open on the failure of said holding coil after an overload has operated, and a switching means for open circuiting said holding coil by any abnormal end position of said switch point, and a semaphore means operated by the position of said overload switch.

13. In a railroad switch system the combination with a motor, a switch point, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, and a clutch means between said motor and said switch point.

14. In a railroad switch system the combination with a motor, a switch point, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, said overload switch further comprising a semaphore system operated by the movement of said magnet core, and a clutch means between said motor and said switch point.

15. In a railroad switch system the combination with a motor, a switch point, a setting switch for said motor, an overload switch comprising a holding coil tending to keep said overload switch open and a main control coil, means operated by said setting switch for first closing said overload switch forcibly and short circuiting said main coil and then removing said short circuit on the continued movement of the setting switch after said overload switch has been cut in, a latch means operated contactingly by said means for holding said overload switch open on the failure of said holding coil after an overload has operated, and a clutch means between said motor and said switch point.

16. In an indicating system for a point switch, an electromagnetic switch comprising a movable magnet core, a holding winding for said core, and switch contacting means on said core to close a circuit through said electromagnetic switch when said holding winding is deenergized; an electrical source for said holding winding and an indicating means energized in part by the current flowing through said holding winding; a switching means operated by said point switch for first open circuiting said holding winding by the initial displacement of said point switch and thereafter closing said holding winding circuit after said electromagnetic switch has operated, and a shunt circuit for said holding coil operatively connected to said contacting means by the movement of said core, the added current of said shunt circuit being sufficient to operate said indicating means.

17. In an indicating system for a point switch, an electromagnetic switch comprising a movable magnet core, a holding winding for said core, and switch contacting means on said core to close a circuit through said electromagnetic switch when said holding winding is deenergized; an electrical source for said holding winding and an indicating means energized in part by the current flowing through said holding winding, a switching means operated by said point switch for first open circuiting said holding winding by the initial displacement of said point switch and thereafter closing said holding winding circuit after said electromagnetic switch has operated, and a shunt circuit for said holding coil operatively connected to said contacting means by the movement of said core, the added current of said shunt circuit being sufficient to operate said indicating means, and a semaphore operatively connected to said movable magnet core.

18. In a point switch system capable of indicating when a switch splitting occurs, an electromagnetic overload switch comprising a movable magnet core, a holding winding and a main winding for said core, an electrical source for said windings and an indicating means energized in part by the current flowing through said holding winding when the point switch is being split, a motor controlled by said overload switch and a setting switch for said motor, means on said setting switch for shunting out said overload switch for said motor, and a latch means for engagement with said magnet core, said latch means operated releasingly by the movement of said setting switch, a plurality of switch contact means mounted on said core for circuit closing when said core moves oppositely to the attractive action of said holding coil, one of said switch contact means comprising a main circuit control and another of said contact means comprising a control for a shunt circuit for said holding coil, means operated by said setting switch for positively displacing said core against the action of said holding coil, said indicating means comprising a switching means operated by said point switch for first open circuiting said holding coil and then closing said holding winding circuit through one of said switch control means, said latch means engaging with said core to stop core from closing said main circuit.

19. In a point switch system capable of indicating when a switch splitting occurs, an electromagnetic overload switch comprising a movable magnet core, a holding winding and a main winding for said core, an electrical source for said windings and an indicating means energized in part by the current flowing through said holding winding when the point switch is being split, a motor controlled by said overload switch and a setting switch for said motor, means on said setting switch for shunting out said overload switch for said motor, and a latch means for engagement with said magnet core, said latch means operated releasingly by the movement of said setting switch, a plurality of switch contact means mounted on said core for circuit closing when said core moves oppositely to the attractive action of said holding coil, one of said switch contact means comprising a main circuit control and another of said contact means comprising a control for a shunt circuit for said holding coil, means operated by said setting switch for positively displacing said core against the action of said holding coil, said indicating means comprising a switching means operated by said point switch for first open circuiting said holding coil and then closing said holding winding circuit through one of said switch control means, said latch means engaging with said core to stop core from closing said main circuit, and a semaphore operatively connected to said movable magnet core.

20. In a railroad switch system the combination with a motor, a switch point operated by said motor, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, an indicating means for said holding winding circuit, and an electrical by-pass for said indicating means, a switch control for said by-pass said switch control comprising a magnet core and a winding therefor, said latter winding being fed by the current through said motor and said overload switch.

21. In a railroad switch system the combination with a motor, a switch point operated by said motor, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, an indicating means for said holding winding circuit, and an electrical by-pass for said indicating means, a switch control for said by-pass said switch control comprising a magnet core and a winding therefor, said latter winding being fed by the current through said motor and said overload switch, and a semaphore operatively connected to said movable magnet core.

22. In a railroad switch system the combination with a motor, a switch point operated by said motor, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, an indicating means for said holding winding circuit, and an electrical by-pass for said indicating means, a switch control for said by-pass said switch control comprising a magnet core and a winding therefor, said latter winding being fed by the current through said motor and said overload switch, a fuse in said main winding circuit, a second winding for said latter magnet core in series with said by-pass, the resistance of said second winding circuit being sufficiently high to render the latter magnet core unattracted when said fuse is blown.

23. In a railroad switch system the combination with a motor, a switch point operated by said motor, a setting switch for said motor, an overload switch comprising a movable magnet core, a holding winding and a main winding, an electrical source for said windings, means for firstly short circuiting said main winding by the operation of said setting switch, then cutting in said overload switch and thereafter removing said short-circuit after said overload switch is cut in, an indicating means for said holding winding circuit, and an electrical by-pass for said indicating means, a switch control for said by-pass said switch control comprising a magnet core and a winding therefor, said latter winding being fed by the current through said motor and said overload switch, a fuse in said main winding circuit, a second winding for said latter magnet core in series with said by-pass, the resistance of said second winding circuit being sufficiently high to render the latter magnet core unattracted when said fuse is blown, and a semaphore operatively connected to said movable magnet core.

The foregoing specification signed at Essen, Germany, this 24th day of January, 1922.

LUDWIG SCHÖN.
FELIX TOBIEN.

In presence of—
HANS GOTTSMANN.
JOHANN DECKERS.